United States Patent

Neff et al.

[15] 3,640,549
[45] Feb. 8, 1972

[54] NONSQUIRT FIFTH WHEEL ASSEMBLY

[72] Inventors: Charles G. Neff, Saratoga; Louis V. Carrier, San Jose, both of Calif.

[73] Assignee: Holland Hitch Company, Holland, Mich.

[22] Filed: Mar. 2, 1970

[21] Appl. No.: 15,485

[52] U.S. Cl. .......................................... 280/435, 280/432
[51] Int. Cl. ........................................................ B62d 53/10
[58] Field of Search ........................ 280/435, 434, 438, 432

[56] References Cited

UNITED STATES PATENTS

| 2,982,566 | 5/1961 | Geerds | 280/435 |
| 2,676,817 | 4/1954 | White | 280/437 |
| 2,623,753 | 12/1952 | Madigan | 280/434 X |

Primary Examiner—Leo Friaglia
Attorney—Price, Heneveld, Huizenga & Cooper

[57] ABSTRACT

A fifth wheel assembly for a tractor-trailer connection, having a special yoke release mechanism.

5 Claims, 10 Drawing Figures

NONSQUIRT FIFTH WHEEL ASSEMBLY

BACKGROUND OF THE INVENTION

This invention relates to fifth wheel assemblies, and more particularly to a novel yoke lock and release mechanism on a fifth wheel.

Fifth wheel assemblies on tractors regularly employ a sliding yoke to straddle and secure the pair of jaws that close around the kingpin mounted on trailers. An effective form of this is shown in U.S. Pat. No. 2,982,566. However, as effective as this yoke is, there have been occasions when a yoke has "squirted" out of securing position with the jaws when a force was applied by the kingpin to the jaws. This of course could be very dangerous by allowing the jaws to open. The inventors herein have discovered that a combination of factors is involved, usually including wear on the inner jaw surfaces where the kingpin is engaged, wear on the outer surfaces of the jaw ears where the yoke engages them, wear on the yoke inner surfaces where they engage the jaw ears, wear on the inner rib surfaces of the main plate where the yoke engages it, and/or misadjustment of the yoke adjuster.

The inventors then developed a unique yoke release control and lock that prevents accidental "squirting," i.e., unwanted release shifting, of the yoke. This unique control fortunately is quite simple in construction and operation, once devised.

SUMMARY OF THE INVENTION

It is therefore an object of this invention to provide a fifth wheel assembly with a unique yoke release lock and control that prevents premature, accidental, release shifting of the yoke, but which enables simple rapid release when desired, with the same actuator and in the same general manner conventionally used. The unit prevents accidental trailer release even if the assembly parts are worn and/or improperly adjusted as noted above. The added components are relatively simple and inexpensive, yet extremely effective.

These and several other objects and features of the invention will become apparent upon studying the following specification and drawings.

DESCRIPTION OF THE PREFERRED EMBODIMENT

Figure 1:
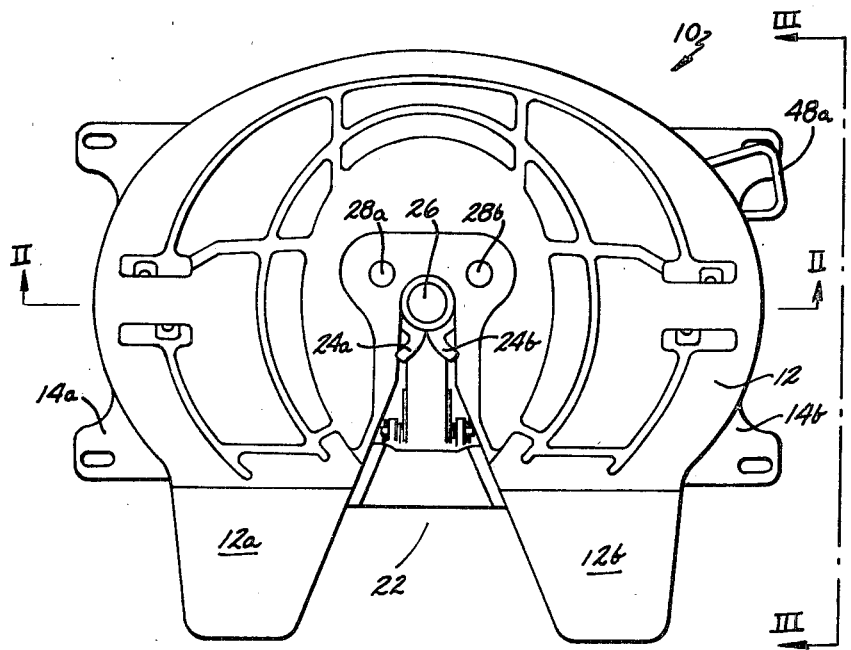
FIG. 1 is a top plan view of the fifth wheel of this invention.
Figure 2:
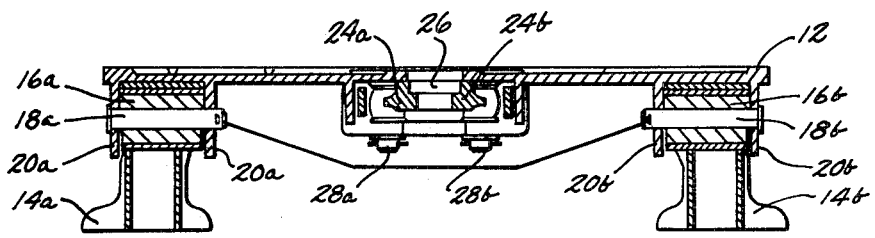
FIG. 2 is a sectional view taken on plane II—II of FIG. 1.
Figure 3:
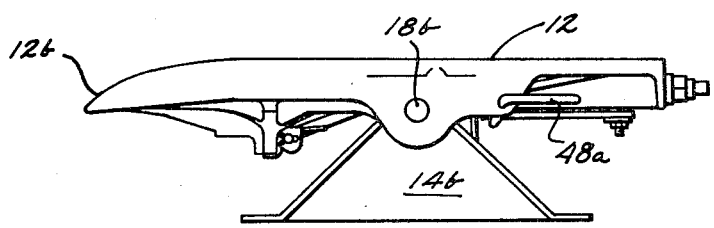
FIG. 3 is an elevational view taken on the plane III—III of FIG. 1.

Referring now specifically to the drawings, the fifth wheel assembly 10 includes a main fifth wheel plate 12 mounted on a pair of lateral end brackets 14a and 14b which are secured to the tractor frame (not shown). The connections between the brackets and plate 12 include coaxial trunnion bearings 16a and 16b, and pivot pins 18a and 18b that extend through the bearings and through flanges 20a and 20b respectively, depending from the undersurface of the opposite sides of fifth wheel plate 12.

In conventional fashion the rearward portion of the fifth wheel plate is bifurcated, having a pair of tapered surfaces 12a and 12b straddling a kingpin receiving, convergent mouth 22 that leads to the kingpin receiving and gripping jaws 24a and 24b. These two jaws are adjacent the blind end of slot or mouth 22, and define a generally cylindrical, kingpin receiving opening 26 therebetween when closed.

The terms forward and rearward and the like, when used herein, have reference to the forward and rearward portions of the wheel when mounted on a tractor.

Jaws 24a and 24b are pivotally mounted respectively on vertical pivot pins 28a and 28b respectively, to the main plate. Jaws 24a and 24b have oppositely, laterally outwardly protruding ears 24c and 24d respectively with outer surfaces engageable with the inner surfaces of a pair of parallel legs 30a and 30b of a U-shaped yoke 30. Yoke 30 is slidable between a forward release position and a rearward jaw-locking position. It is laterally restrained during these movements by a pair of depending integral flanges 32a and 32b of main plate 12. These flanges extending generally rearwardly, converge slightly towards the rear end of the fifth wheel, to assure engagement of the terminal end portions of yoke legs 30a and 30b with ears 24c and 24d of the jaws as well as flanges 32a and 32b. Forming part of the yoke 30, and extending from the center of the forward crossleg thereof is a shaft 30c which extends forwardly through the arcuate depending flange 34 of main plate 12. A coiled compression spring 36 surrounds shaft 30c, and engages the crossleg of the yoke and flange 30, on opposite ends thereof, to bias the yoke to the rearward, jaw closure position illustrated in FIG. 4. Adjustment of the compression spring and thus of the yoke is enabled by a threaded connection between the extended threaded end 30c' of shaft 30c, and a nut 38 thereon.

Yoke 30 can be manually shifted between jaw-securing position (FIG. 4) and jaw releasing condition (FIG. 5), in a forward linear shift against the bias of compression spring 36, by the cooperation of a cam follower 40 affixed to the center of the crossleg of the yoke, in cooperation with cam track 42a in cam plate 42. Plate 42 is pivotally mounted at 42b on a vertical pin secured to a fixed support 46 integral with plate 12. Cam track 42 has a curvilinear configuration which has one end of greater radial distance from pivot 42b than the other end such that, with shifting of the cam in a clockwise direction, as viewed from the bottom of the fifth wheel, (or in a counterclockwise direction as viewed from the top of the fifth wheel), (FIG. 5) cam follower 40 will be forced forwardly, relative to the fifth wheel, to thereby pull yoke 30 forwardly, out of engagement with ears 24c and 24d of jaws 24a and 24b. This type of construction is known, as is disclosed for example in U.S. Pat. No. 2,982,566 referred to above.

Further, safety stop 78, pivotally mounted on transverse pin 80, extends between the jaws, to be depressed by an entering kingpin at a proper height. If an entering kingpin is too high, stopblock 78 will not be depressed and prevents the jaws from closing. Such is explained in the identified prior patent.

Figure 4:
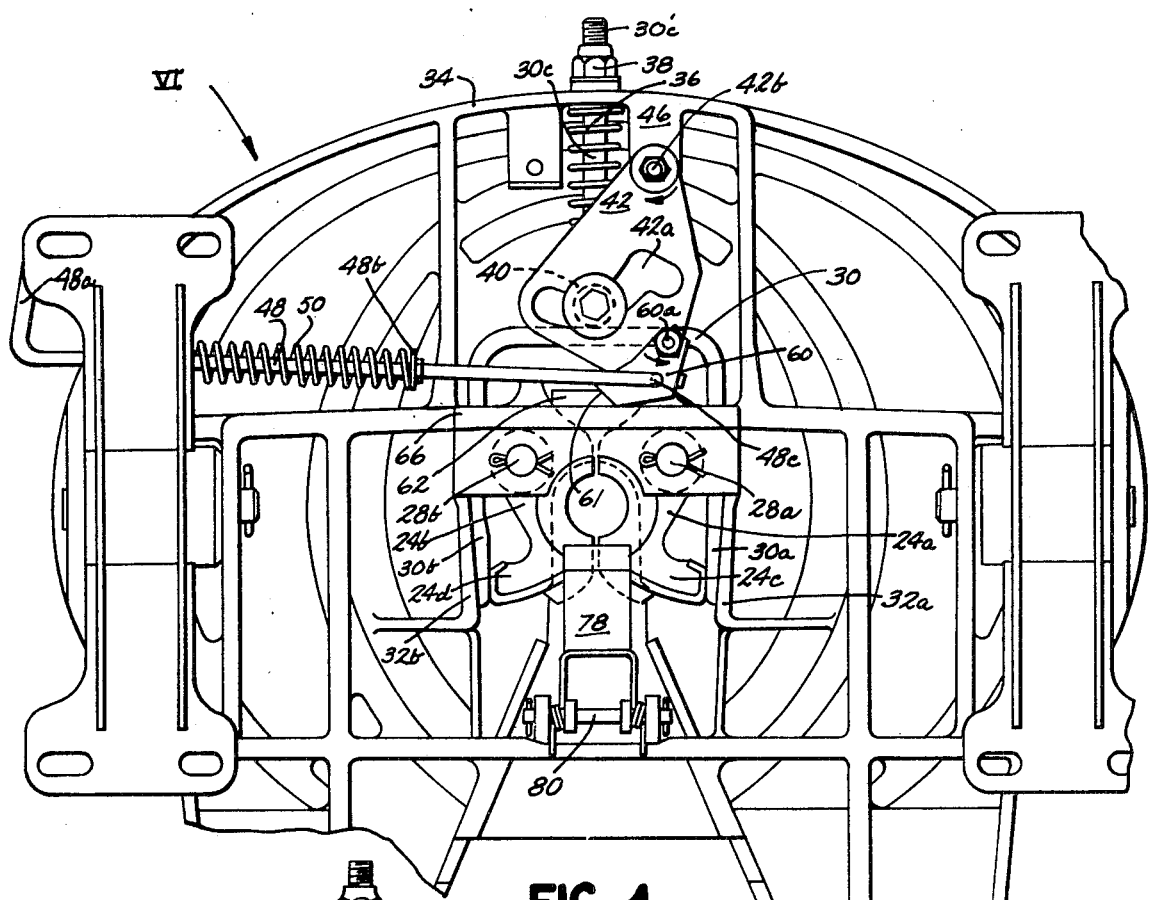
FIG. 4 is an enlarged bottom view of the fifth wheel in FIG. 1, shown in the coupled, i.e., closed, position.
Figure 5:
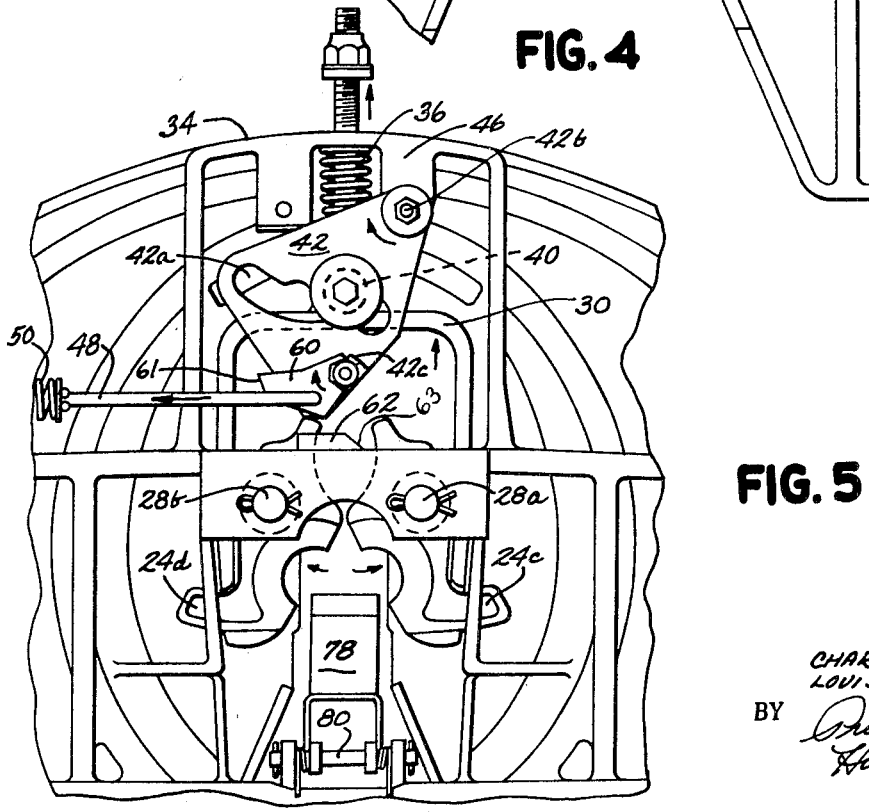
FIG. 5 is a fragmentary enlarged bottom view comparable to FIG. 4, but with the jaw mechanism in the uncoupled, i.e., opened, position.

As explained in the introduction to this specification, there have been occasions where the yoke in the prior units tended to "squirt" forwardly out of the securing position in FIG. 4 to the unsecured position in FIG. 5, without an operator purposely doing this. This caused the cam plate to rotate, improperly releasing the fifth wheel connection to allow escape of the kingpin and hence, of the trailer. The present invention was devised to prevent this.

Figure 8:
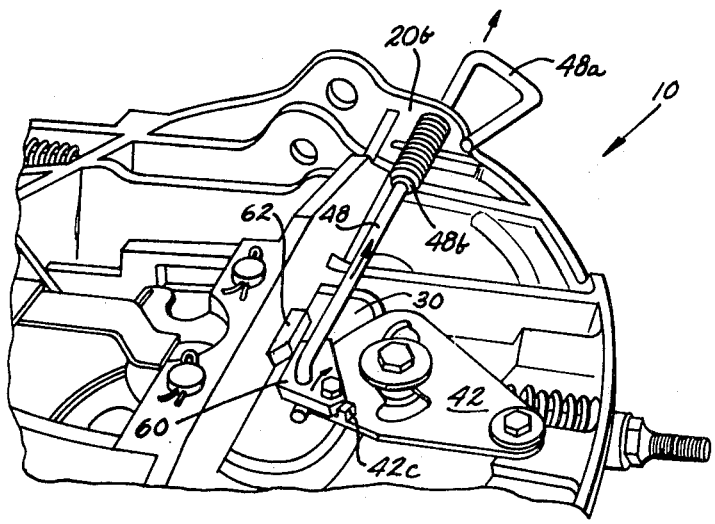
FIG. 8 is a fragmentary perspective view taken from the same angle as FIG. 7, showing the first stage of manual release of the mechanism.
Figure 9:
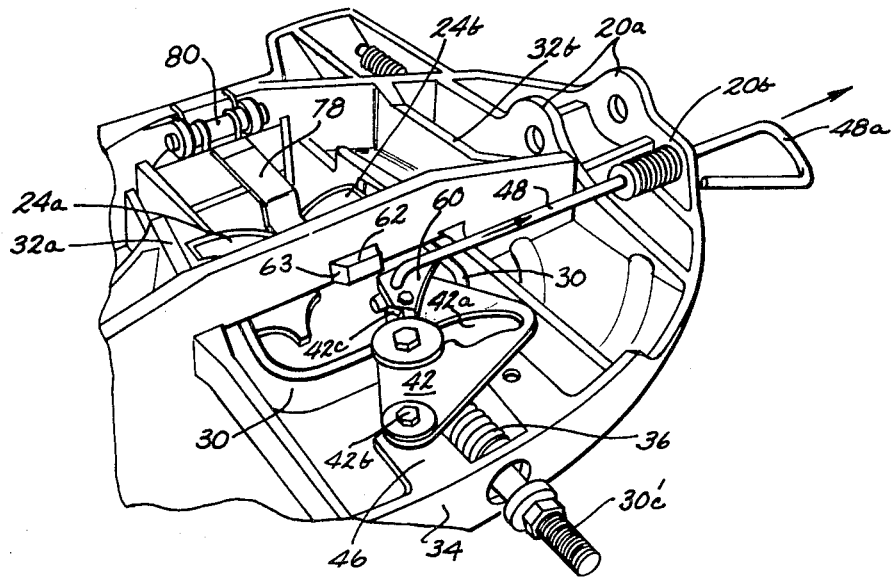
FIG. 9 is a perspective view of the apparatus in FIG. 8, showing the fifth wheel being shifted to the release or opened position.

Specifically, a special locking or binding linkage was devised relative to the release pull handle 48 and cam plate 42. In the prior device, the inner end of pull handle 48 pivotally engaged cam plate 42. In this device there is special locking linkage added as set forth hereinafter. The outer end of the pull rod 48 includes a manual handle 48a. This rod 48 extends through one of the flanges 20b (FIG. 8). A compression spring 50 encircles rod 48 and is restrained between a stop 48b affixed to the center of rod 48, on one end, and outer edge flange 20c of the main plate on the other end. This compression spring biases rod 48 to an inward nonrelease position.

In this invention, the inner end of rod 48 is pivotally attached to a trigger link 60 forming part of the special lock mechanism, rather than being pivotally attached directly to the cam plate 42 as in the prior art. Link 60 is pivotally attached at pin 60a to cam plate 42 in a position relatively between pivot point 48c of rod 48 to trigger 60, and pivot pin 42b from cam plate 42 to a fixed mount portion of the fifth wheel main plate.

Also cooperative with trigger link 60 is a lock stop 62 welded or otherwise suitably affixed to or integral with a transverse fixed flange member 66 of the main plate. On the end of link 60 opposite its pivot point 60a, is a locking abutment surface 61 that engages with a tapered, correspondingly oriented surface 63 on wedge lock member 62. Link 60 and stop lock 62 are so arranged that linear pulling force on rod 48 rotates member 60 around pivot 60a in a fashion to rotationally shift member 60 out of engageable relationship with fixed element 62. By way of further explanation, the loci of pivots 48c, 60a, and 42b are initially almost, but not quite, aligned, such that the angle therebetween is approaching but not reaching 180°. This is true when the yoke is in the jaw securing rearward position. Stop 42c serves to prevent rotation of trigger 60 to a position of alignment, thereby keeping the angle below 180°. Pulling on handle 48 to rotate link 60 decreases this obtuse angle to allow link 60 to move past stop 62. Further movement of the handle will therefore cause the cam plate to operate to move the yoke.

When the yoke is in jaw securing position, however, compression spring 50, tending to shift 48 to its inward position, also tends to rotate member 60 in the opposite rotational direction, tending to keep pivot 48c, pivot 60a, and pivot 42b almost in general alignment. Any force of the yoke member applied through its cam follower 40 to cam track 42a of cam plate 42 and tending to rotate the cam plate from the securing position to the releasing position tends to increase this angle. This is by reason of the fact that slight rotation of cam plate 42 in the clockwise direction, as viewed from the bottom of FIG. 4, causes slight movement of pivot 68 in this same direction, with consequent slight counterclockwise rotation of link 60 due to the fact that compression spring 50 biases the pivot 48c to its stable position so that it does not rotate with the slight rotation of cam plate 42. Hence, lock portion 60 tightly engages fixed stop 62 of the lock mechanism with further clockwise rotation of cam plate 42, creating a binding locking relationship. Further rotation of cam plate 42 is prevented because of this binding relationship. This occurs without the angle between the three pivots 42b, 60a, and 48c ever reaching 180°. Hence, accidental squirting of the yoke to the release forward position is prevented.

Yet, manual release of the mechanism can be achieved readily by pulling on handle 48a of rod 48. Specifically, this pulling action compresses spring 50, rotating locking link 60 in clockwise direction around its pivot 60a (as viewed from the bottom) so that member 60 moves out of engageable relation to fixed member 62 as the rod is pulled, decreasing the angle between the three pivot points. When member 60 is rotated to a sufficient angle to cause it to clear member 62, member 60 preferably strikes a small stop 42c attached to plate 42. Further lineal movement of rod 48 causes link 60 and plate 42 to act as one, i.e., causing cam plate 42 to rotate about its pivot, (clockwise as viewed from the bottom), to cause cam follower 40 to move forwardly, i.e., towards flange 34, thereby shifting yoke mechanism 30 forwardly (see arrow in FIG. 5), compressing spring 36 and allowing jaws 24a and 24b to pivot in opposite directions about their pivot pins 28b as indicated by the arrows in FIG. 5. This enables release of the kingpin (not shown) from receiving socket 26. The yoke is retained in this cocked position by the extension of cam follower 40 into the dead end on the opposite end of cam slot 42a, and also by pressure between the ends of yoke legs 30a and 30b against the concavities on the backside of ears 24c and 24d.

Figure 6:
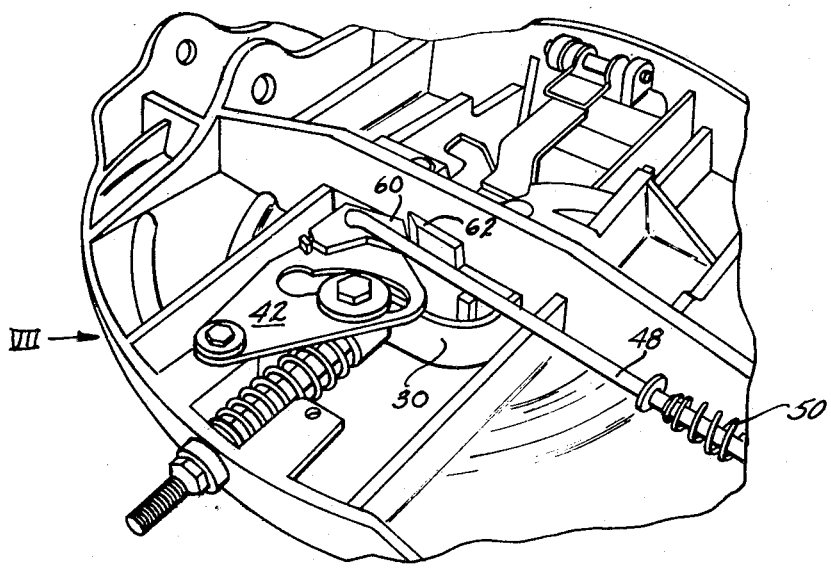
FIG. 6 is a fragmentary perspective view of the bottom of the fifth wheel of this invention shown in the closed condition, viewed from the direction VI in FIG. 4.
Figure 10:
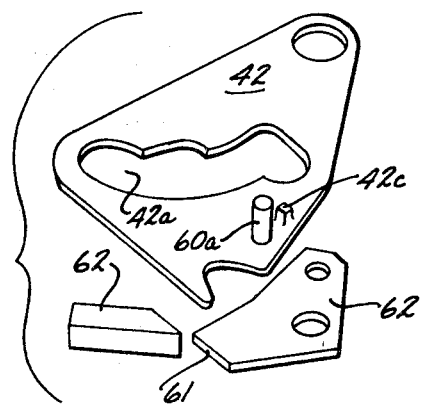
FIG. 10 is a fragmentary exploded view of three of the components of the inventive fifth wheel.
Figure 7:
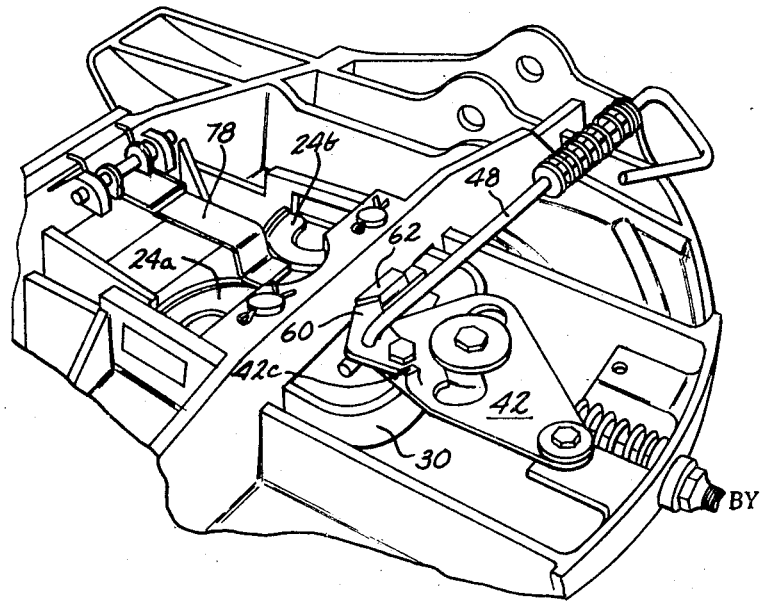
FIG. 7 is a fragmentary perspective view of the fifth wheel in FIG. 6 taken from the direction VII.

Closure of the jaws 24a and 24b again occurs with introduction of a kingpin through the receiving mouth 22 and into engagement with the back edges of the semicircular portion inside jaws 24a and 24b, pivoting them to their closed position at which time the jaws swing together, and spring 36 shifts yoke 30 astraddle of the jaw ears and into a tight binding engagement therewith. This rotates cam plate 42 in the counterclockwise direction, as viewed from the bottom of the fifth wheel, dragging the locking link 60 back to its position illustrated in FIG. 6.

Various additional advantages and obvious minor modifications to this structure will be apparent to those in the art upon studying this disclosure. Hence, it is considered that this invention is to be limited only by the scope of the appended claims and the reasonable equivalents thereof, rather than by the particular details of the illustrative embodiment.

The embodiments of the invention in which an exclusive property or privilege is claimed are defined as follows.

1. A fifth wheel assembly including main plate means, a pair of pivotal kingpin-engaging jaws movable between an open jaw position and a closed jaw position, and a jaw-securing yoke movable between a securing position straddling said jaws when in their closed jaw position, and a jaw release position; camming means between said yoke and said main plate means arranged to shift said yoke from said securing position to said release position, and manual actuator means for operating said camming means, the improvement comprising: locking means pivotally engaging said camming means and said actuator means such that said locking means abuts a portion of said main plate in a manner to lock and arrest movement of said yoke from its securing position in response to forces applied to said yoke other than by said actuator means, said locking means releasing with the operation of said actuator means, enabling shifting of said yoke by said camming means.

2. The fifth wheel assembly in claim 1 wherein said locking means includes interbinding elements, part being fixed to said main plate and part being connected between said actuator means and said camming means.

3. The fifth wheel assembly in claim 1 wherein said camming means includes an element pivotally mounted on said main plate means and having a curvilinear cam track, a cam follower in said cam track and attached to said yoke, and said locking means includes a first fixed member, and a second member shiftable into binding engagement with said first fixed member, pivotally connected to said camming means element, and pivotally connected to said actuator means, such that shifting of said actuator means causes shifting of said camming means without binding engagement between said locking means members.

4. A fifth wheel assembly including a main plate means, a pair of pivotal kingpin-engaging jaws movable between a spread open jaw position and an adjacent closed jaw position, and a jaw-securing yoke movable between a securing position straddling said jaws when in their adjacent closed jaw position, and a jaw release position; a cam plate pivotally mounted adjacent said yoke and containing a cam track; a cam follower attached to said yoke and received by said cam track for shifting the yoke from its securing position to its release position; the improvement comprising a release trigger pivotally mounted to said cam plate, a fixed trigger abutment on said main plate means, a pull actuator connected to said trigger, and biasing means normally biasing said trigger toward engagement with said abutment to prevent rotation of said cam plate in response to force from said yoke, said pull actuator being arranged to shift said trigger out of engagement relation to said abutment and then to shift said cam plate for shifting of said yoke.

5. The assembly in claim 4 wherein said pull actuator has a pivot connection to said trigger, said trigger has a pivotal connection to said cam plate, and said cam plate has a pivotal connection to said main plate means, with the angle therebetween being normally held by said biasing means to a large obtuse angle approaching but not reaching 180°.

* * * * *